3,183,102
BLANCHING AND CANNING PROCESS FOR GREEN VEGETABLES
George J. Malecki, 418 N. State St., Chicago 10, Ill.
No Drawing. Filed June 19, 1961, Ser. No. 117,298
5 Claims. (Cl. 99—186)

The present invention relates to the preservation of the color in canned green vegetables (such as canned green peas, pea soup, baby food pea puree, asparagus, lima beans, spinach etc.). The primary object of the present invention is the preservation of the color in canned green peas.

It is well known that the color of canned green vegetables can be preserved by the alkalization of canning medium, with which the vegetables are sterilized (processed). Numerous patents have been granted and processes developed wherein alkaline canning media are employed.

According to prior methods, where storage of canned product in nonrefrigerated warehouses was employed, the canning medium was of such alkalinity that the pH after canning was over 8.00 and it was the accepted belief that with a lesser pH of the canning medium the initial green color of the processed peas faded out too soon, and then was not significantly better than the color of peas canned by conventional methods. The use of canning medium having a pH after canning in excess of 8.00 does have an adverse effect on the taste and texture of the peas and the efforts in the past have been directed toward modifications of the canning processes to permit the use of canning medium of this pH without these adverse effects. No process in which the pH after canning exceeds 8.0 has, as yet, been included in standards of identity for canned peas by the Food and Drug Administration.

It is the object of the present invention to provide a process wherein the alkalinity of the canning medium after canning is below pH 8.00 but with a color stability equal to that obtained with former processes wherein pH of the canning medium after canning is at least 8.5 and with no adverse effect on the color and texture of the peas.

I have discovered that the green color of the vegetables will be preserved for a shelf-life of several months when canned or otherwise processed by standard procedures, if the vegetables prior to processing are blanched in an alkaline bath such as hereinafter described. In addition to the description given below it can be stated in general terms that this blanching bath is composed of a solution or suspension of a buffering agent and has a pH of between 7.5 and 12.00 and preferably between 9.0 and 11.0, said buffering agent having its maximum buffering capacity at least in part within the above specified pH ranges.

I have also discovered that if the canning medium is alkalized as hereinafter described to give a pH after canning of 7.5 to 7.9 the color degradation after storage without refrigeration up to twelve months is insignificant. It should be emphasized that pH after canning 7.2 to 7.5 may also be employed even though the color stability obtainable with such pH level is usually only 4 to 8 months. Such peas may be acceptable as a product of commerce for certain purposes where consumption schedules are short and well defined, such as for instance in summer and fall camps (during same canning year) and for military purposes.

The following are specific examples of processes embodying my invention.

EXAMPLE 1

*Product: canned peas*

After usual pre-processing treatments the peas are blanched for 4 minutes at 205° F. in a blanching medium composed of a primary calcium glutamate of a concentration such that the calcium calculated as $CaCO_3$ equals 500 p.p.m. (i.r. 0.005 molar solution) plus monosodium glutamate at a concentration 0.05 molar and with added glutamic acid or a mixture of calcium hydroxide with sodium hydroxide (in molar ratio 1:10) sufficient to give pH 10.0–11.0. The peas are then canned and sterilized (processed) in the standard (salt-sugar only) brine without added alkali for 6–10 minutes at 260°–250° F. (as required to reach commercial sterility) in continuous agitated cooker.

The color change after 3 to 6 months' storage in non-refrigerated warehouses (at room temperature) is insignificant. The taste and texture of the peas is not affected by the blanching treatment.

EXAMPLE 2

*Product: sodium-free pea soup and baby-food pea puree*

The peas are blanched in a blanching medium containing a suspension of calcium carbonate $(CaCO_3)$ of a concentration 2,500 p.p.m. for four minutes at 200° F. During blanching in continuous blancher the pH of the blanching medium is adjusted periodically to 9.0–10.0 by the addition of calcium hydroxide. Some commercially available antifoaming agent accepted by Food and Drug Administration is added to prevent excessive foaming during blanching (such as for instance the silicone compound sold under the trademark "Antifoam A"). After blanching the peas are processed in customary manner to produce the pea soup or pea puree and 8 oz. cans are used in this example. After the cans are filled an alkalizing pill containing 0.4 gram of potassium methionate and 0.2 gram of potassium hydroxide is added to each can. After the cans are sealed they are well agitated and sterilized in the usual manner. After six months' storage without refrigeration the color change is insignificant.

EXAMPLE 3

*Product: canned peas*

Blanching medium contains calcium glutamate at concentration 3,000 p.p.m. of calcium as $CaCO_3$ adjusted to pH 9.0 to 10.0 with $Ca(OH)_2$ or glutamic acid.

Blanching conditions: 5 minutes at 200° F.

Canning medium consists of conventional salt-sugar brine with added—per 16 ounce can—2.5 ml. of disodium glutamate solution at one molar concentration plus 2.7 ml. of sodium hydroxide solution 10% by weight.

Processing in continuous agitated cooker for 8 minutes at 256° F.

Results: Next day after canning peas show pH 7.6–7.9 and there is no significant change in color after 10 months in storage without refrigeration. Taste and texture of canned peas is good, and to a significant degree preferred to the taste and texture of conventional peas.

EXAMPLE 4

*Product: canned peas*

Blanching medium consists of waste blanching water remaining in continuous blancher after blanching conventionally peas for about 8 hours. This blanching water contains considerable amount of suspended pea tissue from broken peas, and this tissue acts as a buffering agent when used in my method, as prescribed. This waste blanching water is alkalized with sodium hydroxide or calcium hydroxide to pH 7.0–8.0.

Blanching conditions: 5 minutes at 195° F.

Brine composition: Conventional salt-sugar brine with added—per 16 ounce can—4 ml. of secondary sodium phosphate $(Na_2HPO_4)$ in one molar concentration and sufficient sodium hydroxide 10% by weight to bring pH after canning to 7.2–7.5 (about 2–3 ml. of sodium hydroxide 10% depending on variety, growth conditions, maturity of fresh peas).

Results: Good flavor and texture and color stability at room temperature for about 5 months, so that these peas should be consumed before that period.

EXAMPLE 5

*Product: pea soup or baby food pea puree*

Blanching medium: Calcium glycinate solution at a concentration of calcium 3000 p.p.m. as $CaCO_3$ with pH adjusted by the addition of calcium hydroxide or glutamic acid to 9.0–10.0.

Blanching conditions: 7 minutes at 190° F.

Brine composition: Conventional salt-sugar brine with added—per 16 ounce can—3.0 ml. of sodium glycinate one molar and sufficient sodium hydroxide 10% by weight (about 3 ml.) to bring pH after canning to 7.5–7.9.

Processing: In conventional stationary retorts 15 minutes at 250° F. or preferably 8 minutes at 260° F. with water cooling under pressure to 70° F.

Results: Good color, taste and texture with green color stability for 12 months at room temperature storage.

EXAMPLE 6

*Product: canned peas*

Blanching medium: orthophosphoric acid ($H_3PO_4$) at a concentration 1% by weight alkalized with calcium hydroxide to pH 7.5–8.5.

Blanching time: 5 minutes at 195° F.

Brine composition: Conventional brine with added—16 ounce can—sodium aspartate at one molar concentration in amount 4 ml. and sodium hydroxide 10% by weight in amount sufficient to raise pH after canning to 7.5–7.9 (usually 4–5 ml.).

Processing: In continuous agitated cooker for 8 minutes at 256° F.

Results: Good taste and texture and color stability for 10 months at nonrefrigerated storage conditions.

EXAMPLE 7

*Product: canned peas*

Blanching medium: Solution of (neutralized with NaOH and decolorized with activated carbon) wheat gluten hydrolyzate (acid hydrolysis) at a concentration 1% by weight with added mixture of calcium hydroxide and sodium hydroxide at a molar ratio 1:5 in sufficient amount to bring pH to 8.5–9.5.

Blanching conditions: 7 minutes at 190° F.

Brine composition: Conventional brine without added alkali.

Processing: 8 minutes at 256° F. in continuous agitated cooker.

Results: Good flavor and texture, while green color stability in nonrefrigerated storage about 8–10 months.

EXAMPLE 8

*Product: canned peas*

After harvesting and washing peas are soaked for 15–30 minutes in water solution of enzyme anthocyanaze (sold by Rohm and Haas Co. in Philadelphia) at a concentration 0.5 to 1.0%. So soaked peas are blanched, brined, canned and sterilized exactly as indicated in Example 3 above.

Results: The obtained green color brightness and stability is higher than that obtained in Example 3, because the enzyme anthocyanaze extracts brown coloration causative pigment (anthocyanidin) from the skin of peas. Obtained green color stability is over 12 months at room temperature storage.

Everywhere where nonrefrigerated warehouse or room temperature storage is mentioned in this specification the conditions are meant which prevail in U.S.A. north of Philadelphia, Pa., to San Francisco, Calif., dividing line. In these states the average warehouse (nonrefrigerated) temperature is about 67° F. in U.S. south of this dividing line air conditioning to about 75° F. should be used in commercial warehouses for storing of my peas.

Everywhere where raw peas are mentioned these are understood to be coming fresh from field without direct sun exposure for total time of more than ½ hour (transported covered and stored in the shade). Otherwise soured peas may be forming which turn dark brown or black in alkaline brine.

In order to maintain a proper texture of the peas attention should be always given to the proper (experimentally chosen) balance between calcium ions and sodium ions during the processing of peas according to my method. This can be either accomplished by blanching in calcium salt and processing in sodium ion containing brine as shown in Examples Nos. 2, 3, 5, and 6, or alternatively it can be achieved by blanching in a medium containing Ca and Na ions in proper ratio (for instance 1:5 to 1:10 or other proper ratio to suit conditions such as maturity, variety, and growing conditions of peas).

The action of anthocyanaze enzyme mentioned in Example 8 consists in destroying the pigments in the skin of peas (anthocyanidins) which cause brown discoloration of brine and peas thus reducing the natural brightness of green color.

Any brine composition can be used with the described method including all compositions disclosed in prior art for color retention of green vegetables, provided the final pH after canning is below 8.00. The quantities of the various additives specified in the above examples are the minimum quantities which may be employed to obtain the best possible results with proper allowances for manufacturing tolerances. Added amounts which do not deviate the pH of the blanching or canning media beyond the specified ranges will not significantly affect the taste, texture or color retention of the canned product.

While the foregoing examples represent the best procedure known to me for practicing my invention it is to understood that the invention is not limited to such examples except in so far as recited in the appended claims.

I claim:

1. The process of canning green vegetables comprising blanching the vegetables in a blanching medium containing calcium glutamate in an amount such that the pH of the medium is in the range 9.0–11.0 and thereafter canning the vegetables in a medium of such composition that the pH after canning is in excess of 7.2 and less than 8.0.

2. The process of claim 1 wherein the canning medium is a substantially neutral brine with added sugar.

3. The process of claim 1 wherein the blanching solution is at a temperature of approximately 205° F.

4. The process of claim 1 wherein the blanching time is approximately 4 minutes.

5. The process of claim 1 wherein the blanching solution is at a temperature of approximately 205° F. and the blanching time is approximately 4 minutes.

References Cited by the Examiner

UNITED STATES PATENTS

| | | | |
|---|---|---|---|
| 1,908,795 | 5/33 | Sharma | 99—186 |
| 2,589,037 | 3/52 | Bendix | 99—186 |
| 2,827,382 | 3/58 | Malecki | 99—186 |
| 2,906,628 | 9/59 | Malecki | 99—186 |

A. LOUIS MONACELL, *Primary Examiner.*

ABRAHAM H. WINKELSTEIN, *Examiner.*